United States Patent
Park et al.

(10) Patent No.: US 12,294,305 B2
(45) Date of Patent: May 6, 2025

(54) MULTI-PHASE POWER CONVERTER AND CONTROL METHOD THEREOF

(71) Applicant: HL MANDO CORPORATION, Gyeonggi-do (KR)

(72) Inventors: Jungmin Park, Gyeonggi-do (KR); Sunghyun Lim, Gyeonggi-do (KR)

(73) Assignee: HL Mando Corporation, Gyeonggi-do (KR)

( * ) Notice: Subject to any disclaimer, the term of this patent is extended or adjusted under 35 U.S.C. 154(b) by 124 days.

(21) Appl. No.: 18/123,258

(22) Filed: Mar. 18, 2023

(65) Prior Publication Data
US 2024/0213875 A1  Jun. 27, 2024

(30) Foreign Application Priority Data
Dec. 22, 2022 (KR) .......... 10-2022-0181658

(51) Int. Cl.
*H02M 3/158* (2006.01)
*H02M 1/32* (2007.01)

(52) U.S. Cl.
CPC ......... *H02M 3/1584* (2013.01); *H02M 1/327* (2021.05); *H02M 3/1582* (2013.01)

(58) Field of Classification Search
CPC ... H02M 1/327; H02M 3/1584; H02M 3/1582
See application file for complete search history.

(56) References Cited

U.S. PATENT DOCUMENTS

2011/0025292 A1*  2/2011  Huang .............. H02J 1/102
                                                                                323/318

FOREIGN PATENT DOCUMENTS

| KR | 10-2018-0071965 | 6/2018 |
| KR | 10-2021-0088194 | 7/2021 |
| KR | 10-2022-0081961 | 6/2022 |

OTHER PUBLICATIONS

Office Action dated Aug. 23, 2024 for Korean Patent Application No. 10-2022-0181658 and its English translation provided by Applicant's foreign counsel.

* cited by examiner

*Primary Examiner* — Jue Zhang
(74) *Attorney, Agent, or Firm* — WOMBLE BOND DICKINSON (US) LLP

(57) ABSTRACT

A multi-phase power converter and a control method thereof according to a preferred embodiment of the present disclosure can minimize a temperature deviation between switches by varying the magnitude of current to be handled by a power conversion module of the multi-phase power converter based on the temperature of the switch.

10 Claims, 7 Drawing Sheets

MULTI-PHASE POWER CONVERTER AND CONTROL METHOD THEREOF

TECHNICAL FIELD

The present disclosure relates to a multi-phase power converter and a control method thereof, and more particularly, to a multi-phase power converter and a control method thereof, which reduce the temperature of a switch in the multi-phase power converter.

BACKGROUND

In a conventional multi-phase power converter, each power conversion module outputs the same current value. Ideally, the temperatures of all switches in the multi-phase power converter should be the same, but depending on circumstances, there is a possibility that only the switch of the power conversion module in a specific phase may have a temperature rise. Depending on the structural positions or operations of the switches, a temperature deviation occurs between the switches. However, there is a limit to the heat dissipation design for preventing the temperature deviation. In addition, when the heat dissipation area increases, there is a problem in that the topology size and price increase.

SUMMARY

In view of the above, the present disclosure provides a multi-phase power converter and a control method thereof, which vary the magnitude of current to be handled by a power conversion module of the multi-phase power converter based on the temperature of a switch.

Other objects not specified in the present disclosure may be additionally considered within the scope that can be easily inferred from the following detailed description and effects thereof.

A multi-phase power converter, according to one embodiment of the present disclosure, includes: a plurality of power conversion units configured to perform power conversion operations for each phase; and a controller configured to control the plurality of power conversion units by differentially distributing currents of the respective power conversion units based on a switch temperature obtained from each of the plurality of power conversion units.

The controller may obtain the switch temperature in each of the plurality of power conversion units through an NTC temperature sensor attached to a switch of the power conversion unit.

The controller may control the plurality of power conversion units by differentially distributing the currents of the respective power conversion units based on the switch temperature and a resistance characteristic curve for each temperature corresponding to the NTC temperature sensor.

The controller may control the plurality of power conversion units by differentially distributing the currents of the respective power conversion units based on the switch temperature and the resistance characteristic curve for each temperature when the switch temperature is greater than a preset threshold temperature.

The controller may control the plurality of power conversion units by obtaining a resistance value using the resistance characteristic curve for each temperature based on the switch temperature and differentially distributing the currents of the respective power conversion units based on the resistance value.

The controller may control the plurality of power conversion units by obtaining an individual current value for each of the plurality of power conversion units using the resistance value corresponding to each of the plurality of power conversion units based on a total current value to be controlled in all of the plurality of power conversion units and differentially distributing the currents of the respective power conversion units based on the individual current value for each of the plurality of power conversion units.

The controller may obtain the individual current value for each of the plurality of power converters using Equation of $I_{ref\_N}=(R_N/R_{total})*I_{ref}$, where N represents the number of power conversion units, $I_{ref\_N}$ represents the individual current value for the N-th power conversion unit, $R_N$ represents the resistance value for the N-th power conversion unit, $R_{total}$ represents the sum of the resistance values for the respective power conversion units, and $I_{ref}$ represents the total current value.

The controller may control the plurality of power conversion units by differentially distributing the currents of the respective power conversion units based on the resistance characteristic curve for each temperature and the switch temperature when at least one switch temperature, among the switch temperatures obtained from the plurality of power conversion units, is greater than the threshold temperature.

A method of controlling a multi-phase power converter including a plurality of power conversion units for performing power conversion operations for each phase, according to one embodiment of the present disclosure, includes: obtaining a switch temperature in each of the plurality of power conversion units; and controlling the plurality of power conversion units by differentially distributing currents of the respective power conversion units based on the switch temperature obtained from each of the plurality of power conversion units.

The obtaining of a switch temperature may include obtaining the switch temperature in each of the plurality of power conversion units through an NTC temperature sensor attached to a switch of the power conversion unit.

The controlling may include controlling the plurality of power conversion units by differentially distributing the currents of the respective power conversion units based on the switch temperature and a resistance characteristic curve for each temperature corresponding to the NTC temperature sensor.

In the controlling, the plurality of power conversion units may be controlled by differentially distributing the currents of the respective power conversion units based on the switch temperature and the resistance characteristic curve for each temperature when the switch temperature is greater than a preset threshold temperature.

In the controlling, the plurality of power conversion units may be controlled by obtaining a resistance value using the resistance characteristic curve for each temperature based on the switch temperature and differentially distributing the currents of the respective power conversion units based on the resistance value.

In the controlling, the plurality of power conversion units may be controlled by obtaining an individual current value for each of the plurality of power conversion units using the resistance value corresponding to each of the plurality of power conversion units based on a total current value to be controlled in all of the plurality of power conversion units and differentially distributing the currents of the respective power conversion units based on the individual current value for each of the plurality of power conversion units.

The controlling may include obtaining the individual current value for each of the plurality of power converters using Equation of $I_{ref\_N}=(R_N/R_{total})*I_{ref}$, where N represents the number of power conversion units, $I_{ref\_N}$ represents the individual current value for the N-th power conversion unit, $R_N$ represents the resistance value for the N-th power conversion unit, $R_{total}$ represents the sum of the resistance values for the respective power conversion units, and $I_{ref}$ represents the total current value.

In the controlling, the plurality of power conversion units may be controlled by differentially distributing the currents of the respective power conversion units based on the resistance characteristic curve for each temperature and the switch temperature when at least one switch temperature, among the switch temperatures obtained from the plurality of power conversion units, is greater than the threshold temperature.

In the multi-phase power converter and the control method thereof according to the preferred embodiment of the present disclosure, it is possible to minimize the temperature deviation between the switches by varying the magnitude of current to be handled by the power conversion module of the multi-phase power converter based on the temperature of the switch.

The effects of the present disclosure are not limited to the effects mentioned above, and other effects not mentioned will be clearly understood by those skilled in the art from the following description.

DETAILED DESCRIPTION

Figure 1:
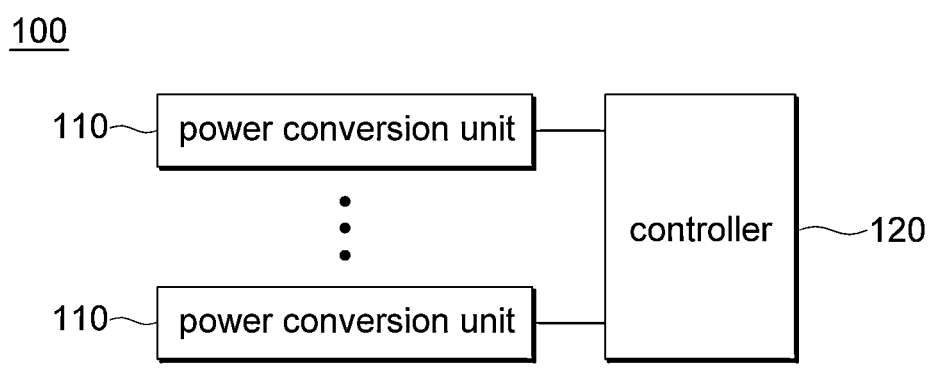
FIG. 1 is a block diagram for explaining a multi-phase power converter according to a preferred embodiment of the present disclosure.

Hereinafter, embodiments of the present disclosure will be described in detail with reference to the accompanying drawings. Advantages and features of the present disclosure, and methods for achieving them, will become apparent with reference to the following embodiments in conjunction with the accompanying drawings. However, the present disclosure is not limited to the embodiments disclosed below and may be implemented in various different forms. The embodiments are provided only to complete the present disclosure and to allow those skilled in the art to which the present disclosure pertains to fully understand the scope of the present disclosure, and the present disclosure is defined only by the scope of the claims. Like reference numerals designate like components throughout the present specification.

Unless otherwise defined, all terms (including technical and scientific terms) used in the present specification may be used in a meaning that is commonly understood by those skilled in the art to which the present disclosure pertains. In addition, terms defined in commonly used dictionaries are not interpreted ideally or excessively unless explicitly specifically defined.

In the present specification, terms such as "first" and "second" are used to distinguish a specific component from other components, and the above-described components are not limited by such terms. For example, a first component may be named a second component, and vice versa.

In the present specification, identification codes (e.g., a, b, c, etc.) in each step are used for convenience of description, and the identification codes do not describe the order of each step, and unless a specific order is described, each step may occur in a different order from the described order. That is, each step may occur in the same order as described, may be performed substantially simultaneously, or may be performed in the reverse order.

In the present specification, expressions such as "have", "may have", "include or comprise" or "may include or comprise" indicate the existence of a corresponding feature (e.g., numerical value, function, operation, or component such as a part), and does not preclude the presence of additional features.

In addition, the term '. . . unit' described in the present specification means software or a hardware component such as a field-programmable gate array (FPGA) or ASIC, and the '. . . unit' performs a certain role. However, the '. . . unit' is not limited to software or hardware. The '. . . unit' may be configured to be in an addressable storage medium and may be configured to reproduce one or more processors. Therefore, as an example, the '. . . unit' refers to components such as software components, object-oriented software components, class components, and task components, processes, functions, attributes, procedures, subroutines, segments of program codes, drivers, firmware, microcode, circuits, data structures and variables. The functions provided within the components or the '. . . units' may be combined into a smaller number of components or '. . . units' or may be further separated into additional components or '. . . units'.

Hereinafter, preferred embodiments of a multi-phase power converter and a control method thereof according to the present disclosure will be described in detail with reference to the accompanying drawings.

First, a multi-phase power converter according to a preferred embodiment of the present disclosure will be described with reference to FIGS. 1 to 4.

Figure 2:
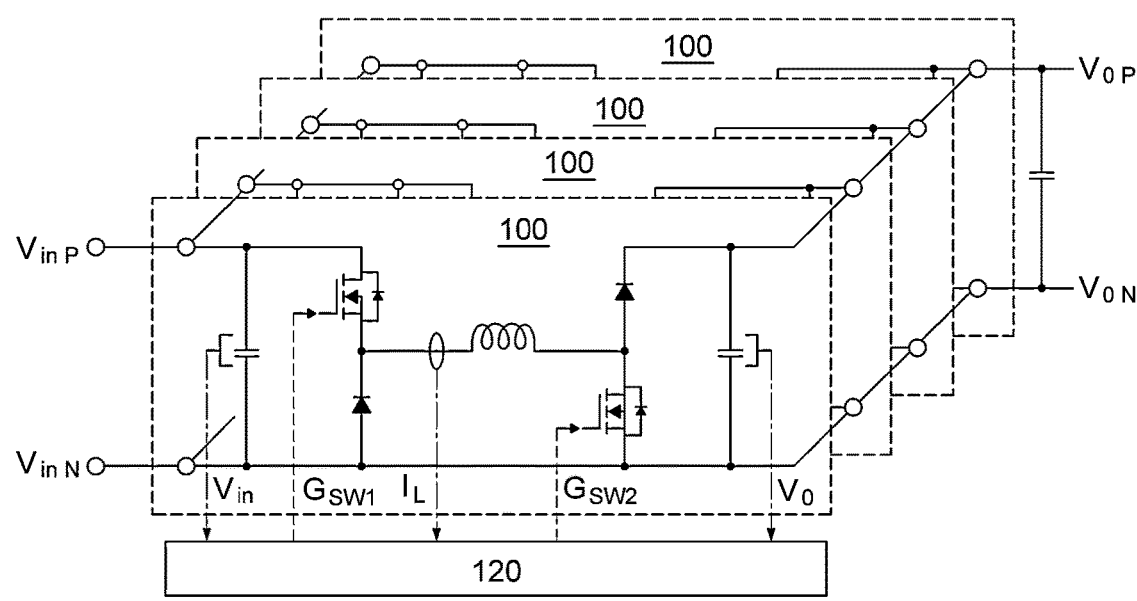
FIG. 2 is a diagram showing an example of the multi-phase power converter shown in FIG. 1.
Figure 3:
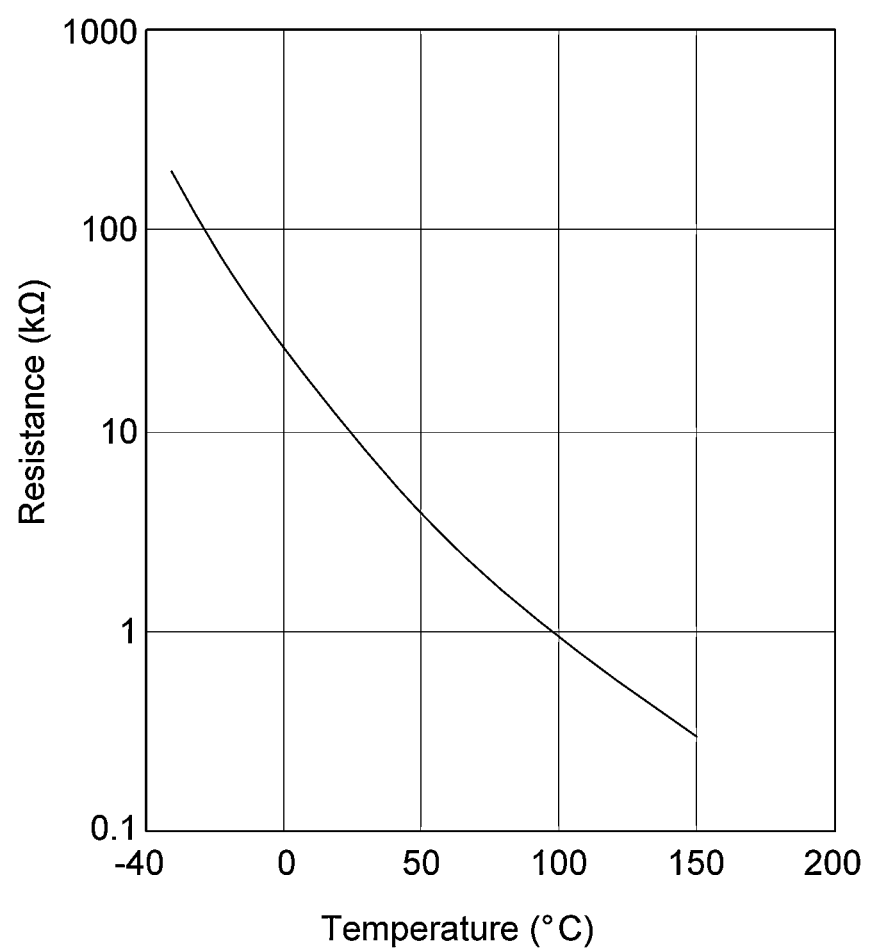
FIG. 3 is a diagram showing an example of a resistance characteristic curve for each temperature according to the preferred embodiment of the present disclosure.
Figure 4:
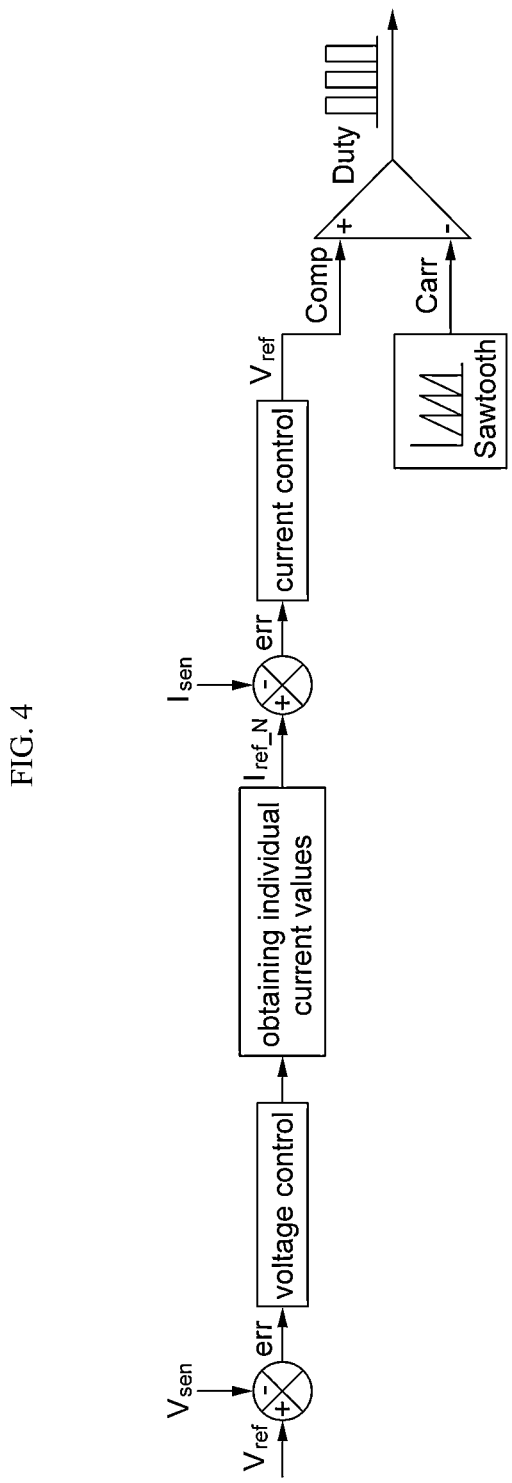
FIG. 4 is a diagram for explaining a current control operation of a controller shown in FIG. 1.

FIG. 1 is a block diagram for explaining the multi-phase power converter according to the preferred embodiment of the present disclosure, FIG. 2 is a diagram showing an example of the multi-phase power converter shown in FIG. 1, FIG. 3 is a diagram showing an example of a resistance characteristic curve for each temperature according to the preferred embodiment of the present disclosure, and FIG. 4 is a diagram for explaining a current control operation of a controller shown in FIG. 1.

Referring to FIG. 1, the multi-phase power converter 100 according to the preferred embodiment of the present disclosure may vary the magnitude of current to be handled by a power conversion module based on a temperature of a switch in the power conversion module. Accordingly, the present disclosure can minimize a temperature deviation between switches.

That is, loss occurs according to the operation of the switch, which results in increase in temperature of the switch. The loss is related to a magnitude of the current, and the temperature has a characteristic of falling as the magnitude of the current decreases. The present disclosure proposes a method of reducing a temperature deviation between switches by controlling the magnitude of the current for each power conversion module using such a characteristic.

To this end, the multi-phase power conversion unit 100 may include a plurality of power conversion units 110 and a controller 120.

The plurality of power conversion units 110 may perform a power conversion operation for each phase. That is, each power conversion unit 110 may perform a power conversion operation for a phase set therefor.

Each of the power conversion units 110 may include a converter or an inverter. For example, as shown in FIG. 2, the power conversion unit 110 may include a non-inverting buck-boost converter. As a matter of course, the power conversion unit 110 shown in FIG. 2 is just one example, and the power conversion unit 110 according to the present disclosure may include any type of converter or inverter other than the non-return buck-boost converter.

The controller 120 may control the plurality of power conversion units 110 by differentially distributing the currents of the respective power conversion units 110 based on a switch temperature obtained from each of the plurality of power conversion units 110.

Here, the switch temperature refers to the temperature of a switch in the power conversion unit 110.

In this case, the controller 120 may obtain the switch temperature from each of the plurality of power conversion units 110 through an NTC temperature sensor (not shown) attached to the switch of the power conversion unit 110.

That is, the controller 120 may control the plurality of power conversion units 110 by differentially distributing the currents of the respective power conversion units 110 based on the switch temperature and the resistance characteristic curve for each temperature corresponding to the NTC temperature sensor. For example, as shown in FIG. 3, the NTC temperature sensor has a characteristic in which a resistance value decreases as the temperature increases.

In more detail, the controller 120 may compare the switch temperature with a preset threshold temperature, and perform one of a variable current control operation and a uniform current control operation based on the comparison result.

When the switch temperature is greater than the threshold temperature, the controller 120 may perform the variable current control operation. In this case, the controller 120 may perform the variable current control operation when at least one switch temperature among the switch temperatures obtained from the plurality of power conversion units 110 is greater than the threshold temperature.

Here, the variable current control operation refers to an operation of controlling the plurality of power conversion units 110 by differentially distributing the inductor currents of the respective power conversion units 110 based on the switch temperature and the resistance characteristic curve for each temperature. Ideally, all switch temperatures of the plurality of power conversion units 110 need to be the same at the same current. However, the temperature of the switch in the power conversion unit 110 may be different from the temperature of the switch in the other power conversion unit 110 due to a structural position or the like, resulting in a temperature deviation. When the switch temperature of a specific power conversion unit 110 is greater than the threshold temperature, the switch temperature of the power conversion unit 110 can be lowered by reducing the output current of the power conversion unit 110 in the present disclosure.

That is, the controller 120 may obtain a resistance value for each of the plurality of power conversion units 110 by using the resistance characteristic curve for each temperature based on the switch temperature of each of the plurality of power conversion units 110.

Then, the controller 120 may control the plurality of power conversion units 110 by differentially distributing the currents of the respective power conversion units 110 based on the resistance value of each of the plurality of power conversion units 110.

In more detail, the controller 120 may obtain individual current values for the respective power conversion units 110 by using the resistance value corresponding to each of the plurality of power conversion units 110 based on a total current value to be controlled in all the plurality of power conversion units 110.

For example, the controller 120 may obtain the individual current value for each of the plurality of power conversion units 110 using Equation 1.

$$I_{ref\_N} = (R_N/R_{total}) * I_{ref} \qquad \text{(Equation 1)}$$

where N represents the number of power conversion units, $I_{ref\_N}$ represents the individual current value for the N-th power conversion unit, $R_N$ represents the resistance value for the N-th power conversion unit, $R_{total}$ represents the sum of the resistance values for the plurality of power conversion units, and $I_{ref}$ represents the total current value.

Then, the controller 120 may control the plurality of power conversion units 110 by differentially distributes the currents of the respective power conversion units 110 based on the individual current value for each of the power conversion units 110.

On the other hand, when the switch temperature is not greater than the threshold temperature, the controller 120 may perform the uniform current control operation. In this case, the controller 120 may perform the uniform current control operation when all of the switch temperatures obtained from the plurality of power conversion units 110 are not greater than the threshold temperature.

Here, the uniform current control operation refers to an operation of controlling the plurality of power conversion units 110 by equally distributing the inductor currents of the respective power conversion units 110.

For example, the controller 120 may equally distribute the inductor currents of the respective power conversion units 110 based on the individual current values obtained using Equation 2.

$$I_{ref\_N} = I_{ref}/N \qquad \text{(Equation 2)}$$

Referring again to FIG. 4, the controller 120 may perform a voltage control operation. In addition, the controller 120 may perform the operation of obtaining individual current values of the respective power conversion units 110 according to the variable current control operation or the uniform current control operation described above. Further, the controller 120 may perform a current control operation based on the individual current values for the respective power conversion units 110. Meanwhile, the controller 120 may consistently minimize a temperature deviation of the switches in the power conversion units 110 by performing such an operation at preset intervals.

Hereinafter, a control method of the multi-phase power converter according to the preferred embodiment of the present disclosure will be described with reference to FIGS. 5 and 6.

Figure 5:
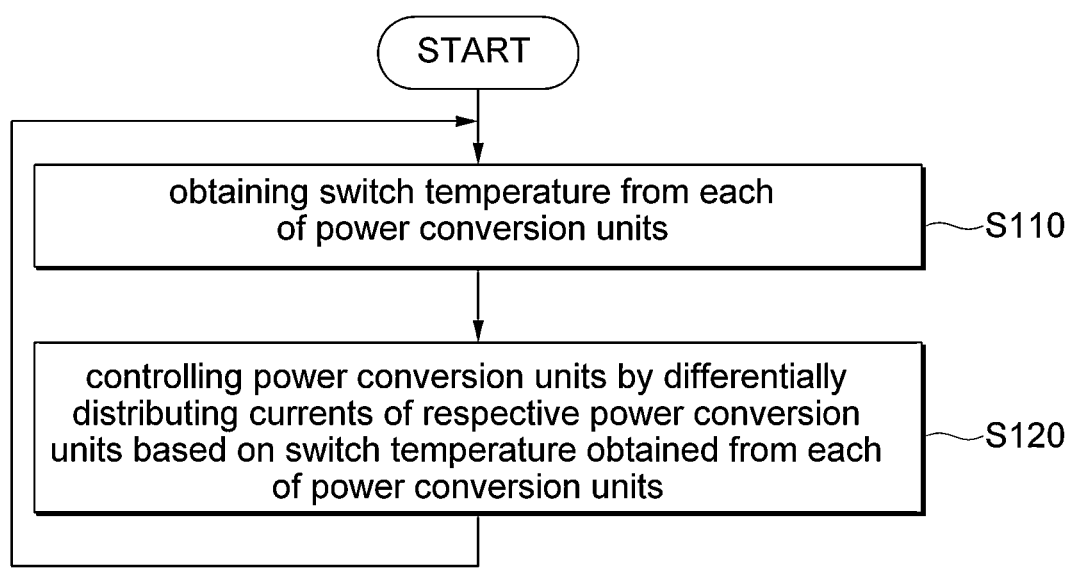
FIG. 5 is a flowchart illustrating a control method of the multi-phase power converter according to the preferred embodiment of the present disclosure.

FIG. 5 is a flowchart illustrating the control method of the multi-phase power converter according to the preferred embodiment of the present disclosure.

Referring to FIG. 5, the controller 120 of the multi-phase power converter 100 may obtain a switch temperature from each of the plurality of power conversion units 110 (S110).

In this case, the controller 120 may obtain the switch temperature from each of the plurality of power conversion units 110 through the NTC temperature sensor attached to the switch of the power conversion unit 110.

Then, the controller 120 may control the plurality of power conversion units 110 by differentially distributing the currents of the respective power conversion units 110 based on the switch temperature obtained from each of the plurality of power conversion units 110 (S120).

Figure 6:
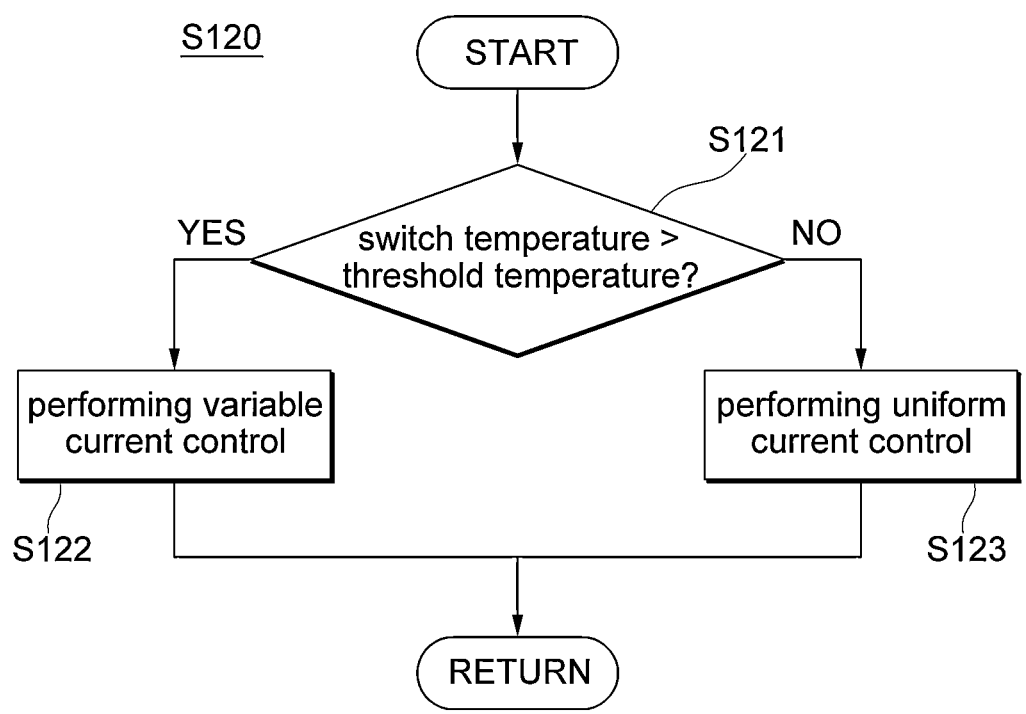
FIG. 6 is a flowchart for explaining control steps shown in FIG. 5.

That is, the controller 120 can control the plurality of power conversion units 110 by differentially distributing the currents of the respective power conversion units 110 based on the switch temperature and the resistance characteristic curve for each temperature corresponding to the NTC temperature sensor FIG. 6 is a flowchart for explaining control steps shown in FIG. 5.

Referring to FIG. 6, the controller 120 may compare the switch temperature obtained from each of the plurality of power conversion units 110 with a threshold temperature (S121).

As a result of the comparison, when the switch temperature is greater than the threshold temperature (YES in S121), the controller 120 may perform the variable current control operation (S122).

In this case, the controller 120 may perform the variable current control operation when at least one switch temperature among the switch temperatures obtained from the respective power conversion units 110 is greater than the threshold temperature.

That is, the controller 120 may obtain a resistance value for each of the plurality of power conversion units 110 by using the resistance characteristic curve for each temperature based on the switch temperature of each of the plurality of power conversion units 110.

Then, the controller 120 may control the plurality of power conversion units 110 by differentially distributing the currents of the respective power conversion units 110 based on the resistance value for each of the plurality of power conversion units 110

In more detail, the controller 120 may obtain individual current values for the respective power conversion units 110 by using the resistance value corresponding to each of the plurality of power conversion units 110 based on the total current value to be controlled in all the plurality of power conversion units 110. For example, the controller 120 may obtain the individual current value for each of the plurality of power conversion units 110 using Equation 1. Then, the controller 120 may control the plurality of power conversion units 110 by differentially distributing the currents of the respective power conversion units 110 based on the individual current value for each of the plurality of power conversion units 110.

On the other hand, when the switch temperature is not greater than the threshold temperature (NO in S121), the controller 120 may perform the uniform current control operation (S123).

In this case, the controller 120 may perform the uniform current control operation when all of the switch temperatures obtained from the respective power conversion units 110 are not greater than the threshold temperature.

For example, the controller 120 may equally distribute the inductor currents of the respective power conversion units 110 based on the individual current value obtained using Equation 2.

Next, a simulation result of the control method of the multi-phase power converter according to the preferred embodiment of the present disclosure will be described with reference to FIG. 7.

Figure 7:
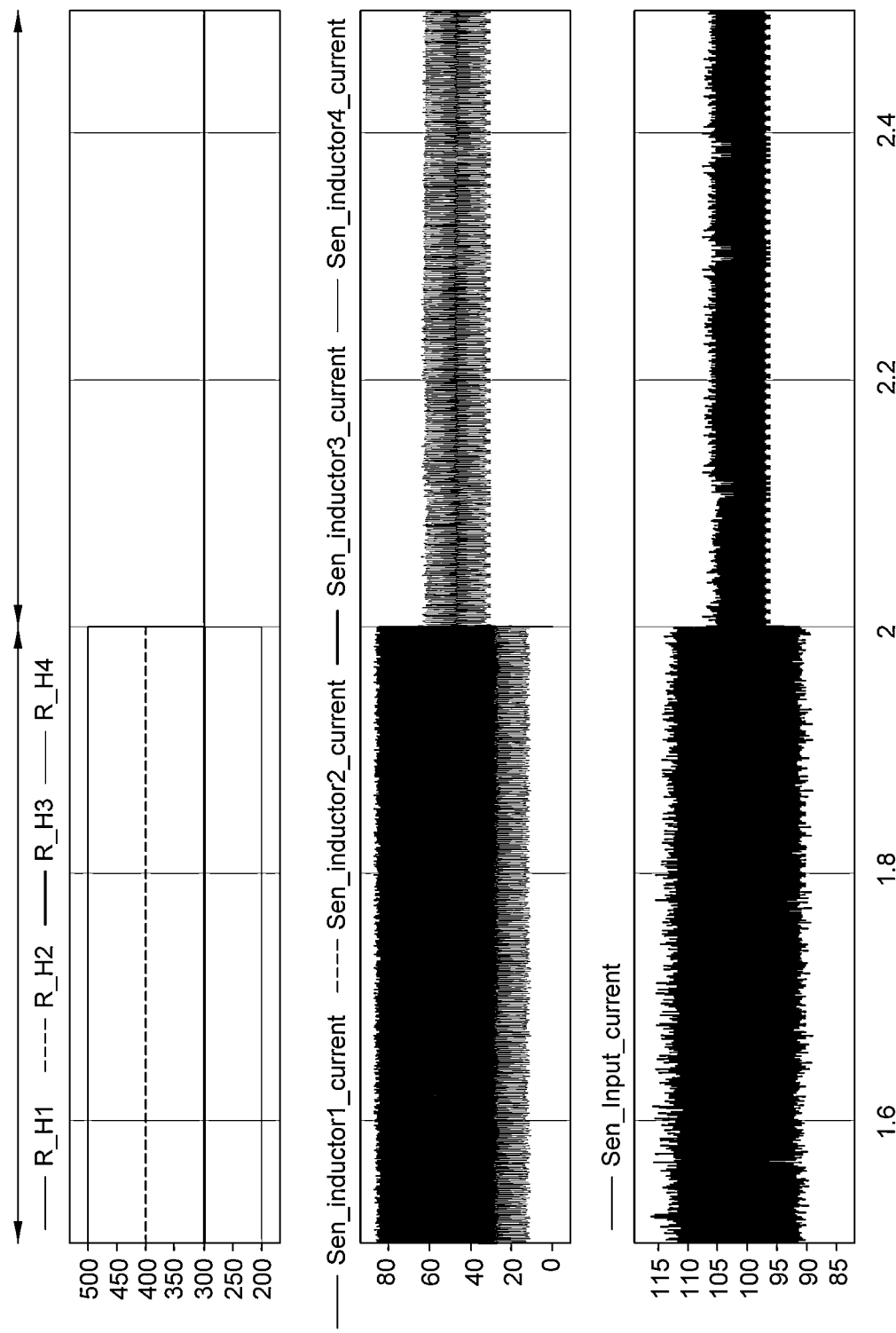
FIG. 7 is a diagram showing an example of a simulation result for a current control operation of the multi-phase power converter shown in FIG. 2.

FIG. 7 is a diagram showing an example of the simulation result for the current control operation of the multi-phase power converter shown in FIG. 2.

When the current control operation according to the present disclosure is performed at 2 seconds in a state in which the temperature deviation between the switches occurs as shown in (a) of FIG. 7, the temperature deviation between the switches does not occur as shown in (b) of FIG. 7.

As such, the present disclosure can minimize the temperature deviation between the switches by varying the magnitude of current to be handled by each of the power conversion units 110 of the multi-phase power converter based on the temperature of the switch.

Even though all components constituting the embodiments of the present disclosure described above are described as being combined or operated as one, the present disclosure is not necessarily limited to the embodiments. That is, within the scope of the object of the present disclosure, one or more of the components may be selectively combined to operate. In addition, although all of the components may be implemented as a single independent piece of hardware, some or all of the components may be selectively combined to be implemented as a computer program including a program module for performing some or all of the combined functions in one or a plurality of pieces of hardware. Further, such a computer program may implement the embodiments of the present disclosure by being stored in a computer-readable recording medium such as a USB memory, a CD disk, or a flash memory and read and executed by a computer. The recording medium of the computer program may include a magnetic recording medium, an optical recording medium, and the like.

The above description is merely an example of the technical idea of the present disclosure, and those skilled in the art may make various modifications, changes, and substitutions without departing from the essential characteristics of the present disclosure. Therefore, the embodiments and the accompanying drawings disclosed in the present disclosure are not intended to limit the technical idea of the present disclosure, but to explain it, and the scope of the technical idea of the present disclosure is not limited by the embodiments and the accompanying drawings. The protection scope of the present disclosure should be construed according to the following claims, and all technical ideas within the equivalent range should be construed as being included in the scope of the present disclosure.

What is claimed is:

1. A multi-phase power converter, comprising:
a plurality of power conversion units configured to perform power conversion operations for each phase; and
a controller configured to control the plurality of power conversion units by differentially distributing currents of the respective power conversion units based on a switch temperature obtained from each of the plurality of power conversion units,
wherein the controller obtains the switch temperature in each of the plurality of power conversion units through an NTC temperature sensor attached to a switch of the power conversion unit,
wherein the controller controls the plurality of power conversion units by differentially distributing the currents of the respective power conversion units based on the switch temperature and a resistance characteristic curve for each temperature corresponding to the NTC temperature sensor, and
wherein the controller controls the plurality of power conversion units by differentially distributing the currents of the respective power conversion units based on the switch temperature and the resistance characteristic curve for each temperature when the switch temperature is greater than a preset threshold temperature.

2. The multi-phase power converter of claim 1, wherein the controller controls the plurality of power conversion units by obtaining a resistance value using the resistance characteristic curve for each temperature based on the switch temperature and differentially distributing the currents of the respective power conversion units based on the resistance value.

3. The multi-phase power converter of claim 2, wherein the controller controls the plurality of power conversion units by obtaining an individual current value for each of the plurality of power conversion units using the resistance value corresponding to each of the plurality of power conversion units based on a total current value to be controlled in all of the plurality of power conversion units and differentially distributing the currents of the respective power conversion units based on the individual current value for each of the plurality of power conversion units.

4. The multi-phase power converter of claim 3, wherein the controller obtains the individual current value for each of the plurality of power converters using Equation of $I_{ref\_N} = (R_N/R_{total}) * I_{ref}$, where N represents the number of power conversion units, $I_{ref\_N}$ represents the individual current value for the N-th power conversion unit, $R_N$ represents the resistance value for the N-th power conversion unit, $R_{total}$ represents the sum of the resistance values for the respective power conversion units, and $I_{ref}$ represents the total current value.

5. The multi-phase power converter of claim 1, wherein the controller controls the plurality of power conversion units by differentially distributing the currents of the respective power conversion units based on the resistance characteristic curve for each temperature and the switch temperature when at least one switch temperature, among the switch temperatures obtained from the plurality of power conversion units, is greater than the threshold temperature.

6. A method of controlling a multi-phase power converter including a plurality of power conversion units for performing power conversion operations for each phase, the method comprising:
obtaining a switch temperature in each of the plurality of power conversion units; and
controlling the plurality of power conversion units by differentially distributing currents of the respective power conversion units based on the switch temperature obtained from each of the plurality of power conversion units,
wherein the obtaining of a switch temperature includes obtaining the switch temperature in each of the plurality of power conversion units through an NTC temperature sensor attached to a switch of the power conversion unit,
wherein the controlling includes controlling the plurality of power conversion units by differentially distributing the currents of the respective power conversion units based on the switch temperature and a resistance characteristic curve for each temperature corresponding to the NTC temperature sensor, and
wherein in the controlling, the plurality of power conversion units is controlled by differentially distributing the currents of the respective power conversion units based on the switch temperature and the resistance characteristic curve for each temperature when the switch temperature is greater than a preset threshold temperature.

7. The method of claim 6, wherein in the controlling, the plurality of power conversion units is controlled by obtaining a resistance value using the resistance characteristic curve for each temperature based on the switch temperature and differentially distributing the currents of the respective power conversion units based on the resistance value.

8. The method of claim 7, wherein in the controlling, the plurality of power conversion units is controlled by obtaining an individual current value for each of the plurality of power conversion units using the resistance value corresponding to each of the plurality of power conversion units based on a total current value to be controlled in all of the plurality of power conversion units and differentially distributing the currents of the respective power conversion units based on the individual current value for each of the plurality of power conversion units.

9. The method of claim 8, wherein the controlling includes obtaining the individual current value for each of the plurality of power converters using Equation of $I_{ref\_N} = (R_N/R_{total}) * I_{ref}$, where N represents the number of power conversion units, $I_{ref\_N}$ represents the individual current value for the N-th power conversion unit, $R_N$ represents the resistance value for the N-th power conversion unit, $R_{total}$ represents the sum of the resistance values for the respective power conversion units, and $I_{ref}$ represents the total current value.

10. The method of claim 6, wherein in the controlling, the plurality of power conversion units is controlled by differentially distributing the currents of the respective power conversion units based on the resistance characteristic curve for each temperature and the switch temperature when at least one switch temperature, among the switch temperatures obtained from the plurality of power conversion units, is greater than the threshold temperature.

* * * * *